United States Patent
Schwersmann et al.

(10) Patent No.: US 8,079,899 B2
(45) Date of Patent: Dec. 20, 2011

(54) MOUNTING COMPONENT FOR SECURING A CROP HANDLING ELEMENT TO A SEPARATOR ROTOR

(75) Inventors: Berthold Schwersmann, Bad Iburg (DE); Jens Bussmann, Ostercappeln (DE); Franz Buddenkotte, Harsewinkel (DE); Manfred Krieft, Harsewinkel (DE); Markus Ramforth, Versmold (DE)

(73) Assignee: CLAAS Selbstfahrende Erntemaschinen GmbH, Harsewinkel (DE)

( * ) Notice: Subject to any disclaimer, the term of this patent is extended or adjusted under 35 U.S.C. 154(b) by 0 days.

(21) Appl. No.: 13/031,450

(22) Filed: Feb. 21, 2011

(65) Prior Publication Data

US 2011/0207511 A1      Aug. 25, 2011

(30) Foreign Application Priority Data

Feb. 24, 2010   (DE) .................. 10 2010 009 163

(51) Int. Cl.
  A01F 7/06   (2006.01)
  B02B 3/06   (2006.01)
(52) U.S. Cl. ......................... 460/66; 460/81
(58) Field of Classification Search .......... 460/66, 460/71, 72, 69, 81
  See application file for complete search history.

(56) References Cited

U.S. PATENT DOCUMENTS

| | | | | |
|---|---|---|---|---|
| 1,450,935 A * | 4/1923 | Anderson | ..................... | 403/270 |
| 3,203,428 A * | 8/1965 | Ausherman | ..................... | 460/71 |
| 3,848,609 A * | 11/1974 | Mortier et al. | ................. | 460/66 |
| 4,136,704 A * | 1/1979 | Dyke | ............................ | 460/68 |
| 4,192,322 A * | 3/1980 | Wilson | ......................... | 460/70 |
| 4,248,248 A * | 2/1981 | De Busscher et al. | .......... | 460/68 |
| 4,280,541 A * | 7/1981 | Reimler et al. | ............ | 144/208.8 |
| 4,422,463 A * | 12/1983 | West | ............................... | 460/67 |
| 4,505,279 A * | 3/1985 | Campbell et al. | .............. | 460/66 |
| 4,889,517 A * | 12/1989 | Strong et al. | .................. | 460/66 |
| 4,936,810 A * | 6/1990 | Strong et al. | .................. | 460/69 |
| 4,946,419 A * | 8/1990 | Cromheecke et al. | ......... | 460/68 |
| 4,964,838 A * | 10/1990 | Cromheecke et al. | ......... | 460/66 |
| 5,125,871 A * | 6/1992 | Gorden | ........................ | 460/69 |
| 5,192,245 A | 3/1993 | Francis et al. | | |
| 5,192,246 A * | 3/1993 | Francis et al. | .................. | 460/72 |
| 5,413,531 A * | 5/1995 | Tanis | ............................ | 460/72 |
| 5,919,086 A * | 7/1999 | Derry | ............................ | 460/72 |
| 6,190,252 B1 * | 2/2001 | Makeeff | ........................ | 460/69 |
| 6,261,176 B1 * | 7/2001 | Welch | ........................... | 460/72 |
| 6,325,714 B1 * | 12/2001 | Tanis et al. | .................... | 460/71 |
| 6,375,564 B1 * | 4/2002 | Amann et al. | .................. | 460/66 |
| 6,494,782 B1 * | 12/2002 | Strong et al. | .................. | 460/71 |
| 6,749,002 B2 * | 6/2004 | Grinberg et al. | ............... | 164/46 |
| 7,022,013 B1 * | 4/2006 | Van Quekelberghe et al. | . | 460/66 |
| 7,390,252 B1 * | 6/2008 | Tanis et al. | .................... | 460/68 |
| 7,632,180 B2 * | 12/2009 | Farley et al. | ................... | 460/66 |
| 2002/0002068 A1 * | 1/2002 | Welch | ........................... | 460/71 |
| 2006/0128451 A1 * | 6/2006 | Ricketts et al. | ................ | 460/59 |
| 2007/0026913 A1 * | 2/2007 | Kuchar | ........................ | 460/112 |
| 2007/0049366 A1 * | 3/2007 | Pope | ............................ | 460/68 |
| 2008/0167100 A1 * | 7/2008 | Farley et al. | ................... | 460/71 |
| 2008/0167101 A1 * | 7/2008 | Farley et al. | ................... | 460/72 |
| 2008/0207286 A1 * | 8/2008 | Farley et al. | ................... | 460/66 |
| 2009/0011807 A1 * | 1/2009 | Becker et al. | .................. | 460/59 |

* cited by examiner

*Primary Examiner* — Arpad Fabian-Kovacs
(74) *Attorney, Agent, or Firm* — Michael J. Striker

(57) ABSTRACT

A mounting component for securing a crop handling element to a separator rotor is embodied as a profile-section component, with side walls facing toward one another and extending in some portions in the circumferential direction of the separator rotor; for securing the mounting component to the surface of the separator rotor, and each of the side walls of the mounting component has a longitudinal weld seam, extending essentially parallel to the side wall, with a weld seam portion extending beyond the length of the respective side wall, which weld seam portion is embodied at an angle to the respective side wall.

6 Claims, 3 Drawing Sheets

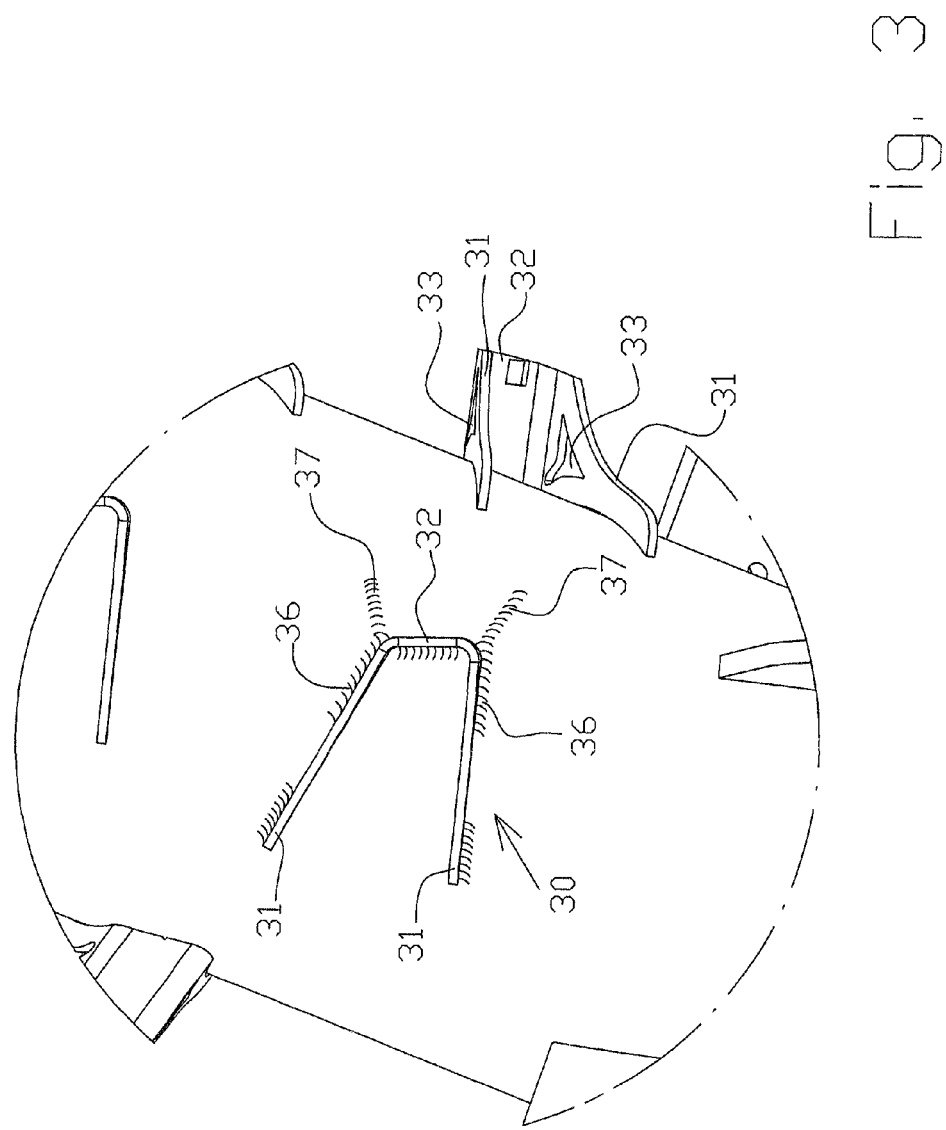

MOUNTING COMPONENT FOR SECURING A CROP HANDLING ELEMENT TO A SEPARATOR ROTOR

CROSS-REFERENCE TO RELATED APPLICATION

The invention described and claimed hereinbelow is also described in German Patent Application DE 10 2010 009 163.4 filed on Feb. 24, 2010. This German Patent Application, whose subject matter is incorporated here by reference, provides the basis for a claim of priority of invention under 35 U.S.C. 119(a)-(d).

BACKGROUND OF THE INVENTION

The present invention relates to a mounting component for securing a crop handling element to a separator rotor, in which the mounting component is embodied as a profile-section component, with side walls facing toward one another and extending in some portions in the circumferential direction of the separator rotor.

From U.S. Pat. No. 5,192,245, a mounting component for securing a thresher element to an axial thresher-separator rotor is known. The mounting component, on which the thresher element is detachably located, is embodied as a profile-section component, with side walls parallel to one another that extend in some portions in the circumferential direction of the separator rotor. The side walls of the mounting component have finlike portions, parallel to the jacket face of the thresher-separator rotor, with which portions the mounting component is joined to the thresher-separator rotor by spot welding. The L-shaped thresher element is mounted on the mounting component and is exposed directly to the stream of crop material to be processed.

It proves disadvantageous in the mounting component of U.S. Pat. No. 5,192,245 that with increasing radial length of the mounting component and/or of the thresher element located on it toward the jacket face of the separator rotor, the forces acting on it increase because of what becomes an unfavorable lever ratio, so that a secure hold of the mounting component welded to the jacket face of the separator rotor cannot be ensured. Detachment of the mounting component from the jacket face causes severe damage to the separator grate, which adversely affects its performance.

SUMMARY OF THE INVENTION

It is therefore the object of the present invention to further develop a mounting component of the type defined at the outset such that a longer service life of the separator grate as well as greater load-bearing capacity of the mounting components and of the crop handling element located on them is achieved.

Accordingly, it is proposed that for securing the support element to the surface of the separator rotor, each of the side walls of the support element has a longitudinal weld seam, extending essentially parallel to the side wall, with a weld seam portion extending beyond the length of the respective side wall. The lengthening of the longitudinal weld seam beyond the length of the side wall, and the embodiment deviating from the aligned continuation of the weld seam portion, leads to a reduction in the peak tensions in the longitudinal weld seams, which occur during operation of the separator rotor, on the side walls of the mounting element via the weld seam portions that protrude past the side walls.

The weld seam portion, going beyond the length of the respective side wall, can be embodied at an angle to the respective side wall.

Preferably, the weld seam portion of the longitudinal weld seam, which weld seam portion goes beyond the length of the respective side wall, should extend in the direction of rotation of the separator rotor. The moment to be absorbed by the mounting element during operation of the separator rotor, which moment is exerted on the mounting element via the crop material coming into contact with the crop handling element, is introduced into the weld seam portions that are lengthened in the force exertion direction, and as a result the peak tensions in the vicinity of the base of the mounting element, which is the transition region from the mounting element to the jacket face of the separator rotor, are reduced.

In an advantageous refinement, the axial spacing of the weld seam portions of the longitudinal weld seams from one another can increase in the direction of rotation of the separator rotor, which favors the reduction in the peak tensions.

In particular, the mounting component can be embodied as a U-profile section.

Advantageously, the side walls of the mounting component can be adapted, on their side toward the surface of the separator rotor, to the cylindrical contour of the separator rotor.

Furthermore, the side walls can have a cutout. The cutout in the side walls can serve, if a sudden load occurs on the crop handling element, to achieve yielding of the mounting element in the direction of rotation of the separator rotor, to prevent the mounting element from being ripped off the jacket face of the separator rotor, which can make the separator rotor unusable. Conversely, the mounting element that has been buckled inward can be replaced comparatively simply.

The novel features which are considered as characteristic for the present invention are set forth in particular in the appended claims. The invention itself, however, both as to its construction and its method of operation, together with additional objects and advantages thereof, will be best understood from the following description of specific embodiments when read in connection with the accompanying drawings.

The invention will be described in further detail below in terms of an exemplary embodiment shown in the drawings.

BRIEF DESCRIPTION OF THE DRAWINGS

FIG. 3 is a detail of a mounting element of FIG. 2, located on the rotor in accordance with the present invention.

DESCRIPTION OF THE PREFERRED EMBODIMENTS

Figure 1:
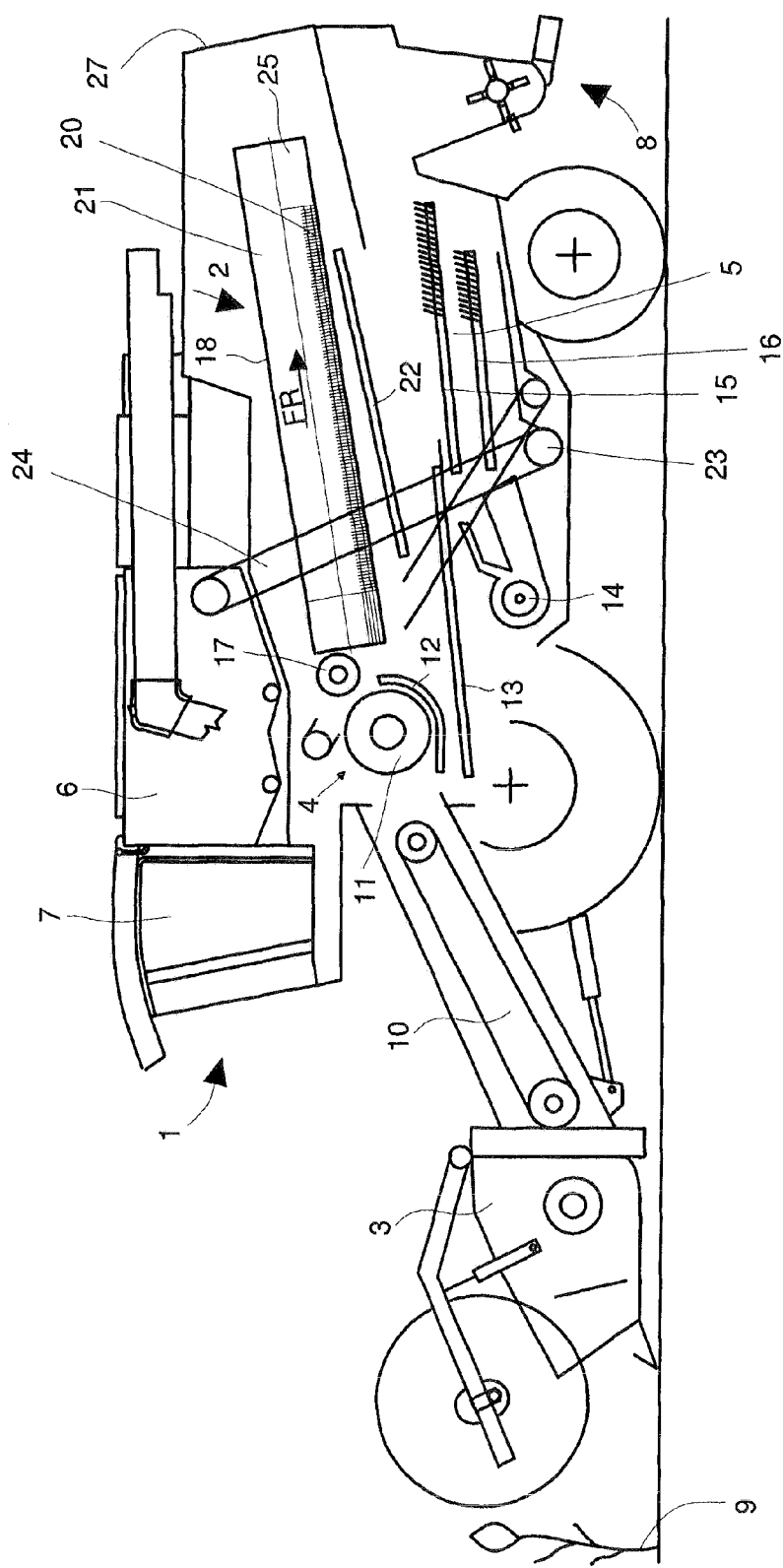
FIG. 1 is a schematic longitudinal sectional view of a combine harvester in accordance with the present invention.

The combine harvester 1 schematically shown in FIG. 1, with an axial separator 2, substantially comprises a cutting mechanism 3, a thresher device 4, a cleaning device 5, a grain bin 6, a cab 7, and a straw chopper 8 downstream of the axial separator 2.

The crop material 9 cut by the cutting mechanism 3 proceeds via an oblique feed conduit 10 to a thresher device 4 that operates on the tangential principle. This thresher device comprises a threshing drum 11 and an associated threshing basket 12. The crop material components separated at the threshing basket 12 are carried via a feeder floor 13 to a cleaning device 5 comprising a housing 14 and an upper and lower screen 15, 16. The grain and short straw mixture, leaving the threshing basket 12 in the tangential direction, is fed into the axial separator 2. The feeding operation is reinforced by a rotating inverter drum 17, located parallel to the threshing drum 11.

The axial separator 2 is located in the longitudinal direction of the combine harvester 1 and essentially comprises a fixed cylindrical housing 18, rising in the feed direction FR, and a rotatably driven separator rotor 19 is supported in this housing. The housing 18 has a lower region with separator grates 20 and a closed, upper cover region 21, with conducting devices located on the inside to reinforce the feeding motion of the crop material. The circumferential region of the separator rotor 19 is provided with variously embodied crop handling elements 34, such as paddles 35, or strips 29, which intensify the separation process.

At the separator grates 20, the grains and components of short straw and chaff contained in the mixture of crop material are separated out and fed to the cleaning device 5 via the return floor 22 located beneath them. Via a feed worm 23 and an elevator 24, the cleaned grains reach the grain bin 6. Inside the axial separator 2, the straw is fed in the direction of the output region 25, and from there, distributed over an outlet width 26, it reaches the straw chopper 8, which is secured, transversely to the travel direction to a frame below the straw outlet hood 27.

Figure 2:
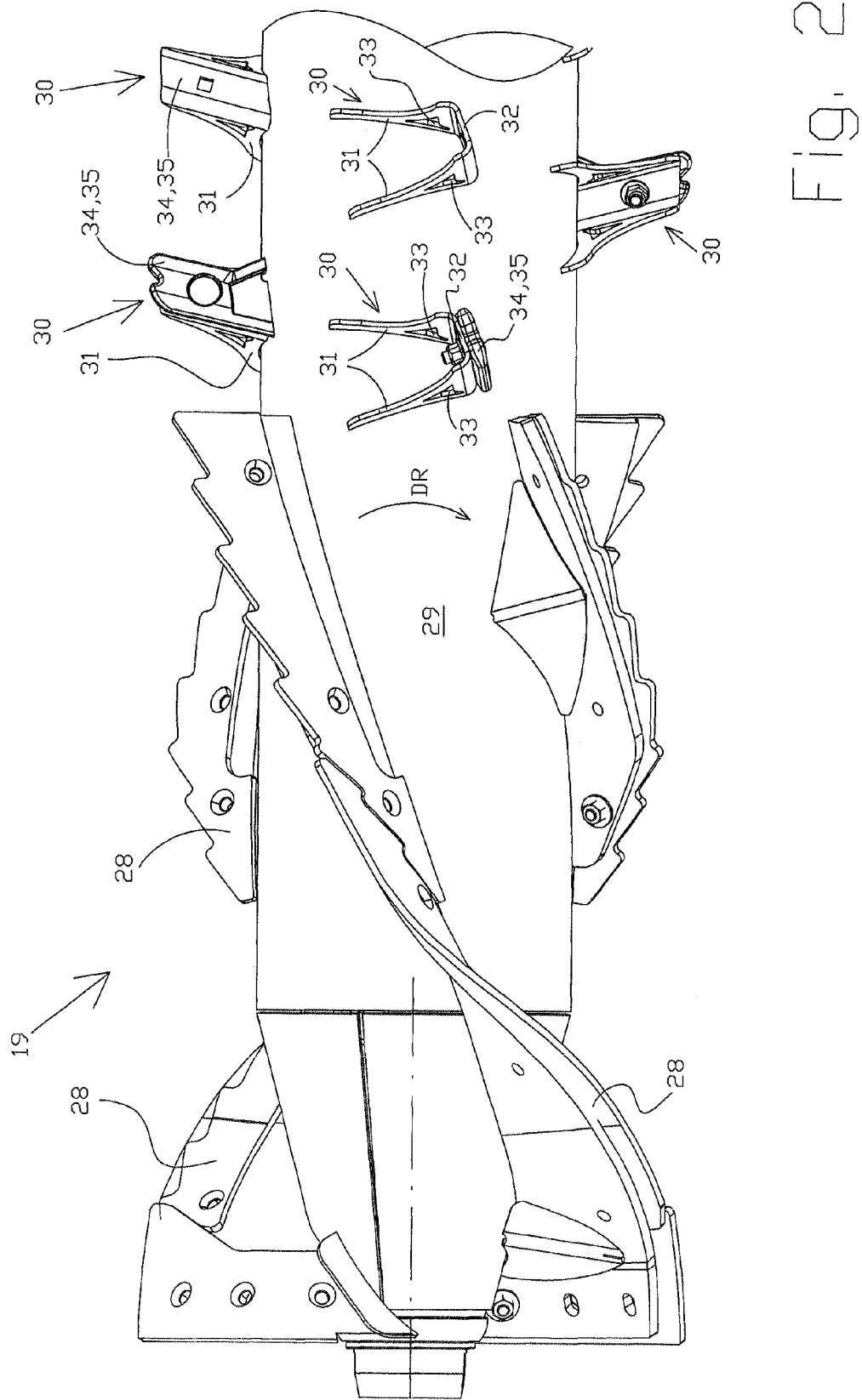
FIG. 2 is a fragmentary view of a rotor of FIG. 1, located in the longitudinal direction in the combine harvester in accordance with the present invention.

The illustration in FIG. 2 shows a fragmentary view of a separator rotor 19 of the axial separator 2 of FIG. 1, located in the longitudinal direction in the combine harvester. The separator rotor 19 is provided in the circumferential direction on its jacket face 29 with strips 28 as well as crop handling elements 34, in the form of paddles 35 located on mounting elements 30. The paddles 35 are located detachably on the mounting elements 30, embodied as profile-section components and located perpendicular to the jacket face 29 of the separator rotor 19, to enable them to be replaced as needed. The mounting elements 30 embodied as U-profile sections are joined to the jacket face 29 of the separator rotor 19 by a welded connection, as shown in detail in FIG. 3. The U shaped mounting element 30 has two facing side walls 31 and one front wall 32, joining the two side walls 31 to one another at the face end. The orientation of the mounting elements 30 relative to the direction of rotation DR of the separator rotor 19 is selected such that the front wall 32 of the mounting element 30, which wall bears the crop handling element 34, points essentially in the direction of rotation DR of the separator rotor 19.

The side walls 31 of the mounting element 30 are provided with cutouts 33, which if a sudden load on the paddle 35 occurs on an order of magnitude that exceeds a threshold value for the impact of a foreign body, such as a rock or the like, and that could lead to ripping of the mounting element 30 from the jacket face 29 of the separator rotor 19, make yielding of the mounting element 30 possible. The mounting element 30 buckles inward or inclines counter to the direction of rotation DR, in the direction of the jacket face 39, so that ripping off of the mounting element 30 from the jacket face 29 of the separator rotor 19 by the impact can be avoided.

In FIG. 3, a detail is shown of a mounting element 30, located on the separator rotor 19, of FIG. 2. The mounting element 30, joined to the jacket face 29 by welding, has one longitudinal weld seam 36 on each of its side walls 31, and the longitudinal weld seam extends at least in some portions along the outer sides, facing away from one another, of the side walls 31 in the vicinity of the base of the mounting element 30, in order to join the mounting element to the jacket face 29 of the separator rotor 19. The respective longitudinal weld seam 36 on the outside of the respective side wall 31 has a weld seam portion 37 in its extension, which weld seam portion is embodied as extending past the side wall 31, preferably in the direction of rotation DR of the separator rotor 19. The weld seam portion 37, protruding past the extension of the side walls 31, of the respective longitudinal weld seam 36 is embodied at an angle to the respective side wall 31. Advantageously, the spacing of the weld seam portions 37 from one another widens in the direction of rotation DR. A V-shaped form has proved especially advantageous. The essential advantage of the lengthening of the longitudinal weld seam 36 beyond the length of the side wall 31, and the embodiment deviating from the aligned continuation of the weld seam portion 37 in the longitudinal direction of the side walls 31, leads to a reduction in the peak tensions occurring during operation of the separator rotor 19 via the longitudinal weld seams 36 that are lengthened by the weld seam portions 37.

It will be understood that each of the elements described above, or two or more together, may also find a useful application in other types of constructions differing from the types described above.

While the invention has been illustrated and described as embodied in a mounting component for securing a crop handling element to a separator rotor, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. A mounting component for securing a crop handling element to a separator rotor, the mounting component comprising:
   side walls facing toward one another and extendable in some portions in a circumferential direction of the separator rotor upon being attached; and,
   a longitudinal weld seam provided in each of said side walls of the mounting component and extending substantially parallel to a respective one of said side walls for securing the mounting component to a surface of the separator rotor,
   wherein said longitudinal weld seam comprises a weld seam portion extending beyond a length of a respective one of said side walls and which is located at an angle with respect to a longitudinal axis of the respective one of said side walls in a direction of rotation of said separator rotor in order that said longitudinal weld seam absorb any moment exerted by crop material coming into contact with a crop handling element attached to the mounting element during intended operation.

2. The mounting component as defined in claim 1, wherein said weld seam portions of said longitudinal weld seams have an axial spacing from one another which increases in a direction of rotation of the separator rotor.

3. The mounting component as defined in claim 1, wherein said component is a U-profile section.

4. The mounting component as defined in claim 1, wherein said side walls of said component, on their side oriented toward the surface of the separator rotor, are adapted to a cylindrical contour of said separator rotor.

5. The mounting component as defined in claim 1, wherein said side walls of said component have a cutout.

6. A combination of a crop handling element, separator rotor and a mounting element, comprising:
the crop handling element;
the separator rotor; and
the mounting component for securing said crop handling element to said separator rotor having side walls facing toward one another and extendable in some portions in a circumferential direction of said separator rotor, and, a longitudinal weld seam provided in each of said side walls for securing said mounting component to a surface of said separator rotor, which longitudinal weld seam extends substantially parallel to a respective one of said side walls and includes a weld seam portion extending beyond a length of a respective one of said side walls and which is located at an angle with respect to a longitudinal axis of the respective one of said side walls in a direction of rotation of said separator rotor in order that said longitudinal weld seam absorb any moment exerted by crop material coming into contact with a crop handling element attached to the mounting element during intended operation.

* * * * *